US011072065B2

(12) United States Patent
Rajendra Zanpure

(10) Patent No.: US 11,072,065 B2
(45) Date of Patent: Jul. 27, 2021

(54) ROBOTIC APPARATUS FOR BUILDING A MULTIDIMENSIONAL OBJECT

(71) Applicant: WIPRO LIMITED, Bangalore (IN)

(72) Inventor: Chaitanya Rajendra Zanpure, Pune (IN)

(73) Assignee: Wipro Limited, Bangalore (IN)

(*) Notice: Subject to any disclaimer, the term of this patent is extended or adjusted under 35 U.S.C. 154(b) by 317 days.

(21) Appl. No.: 15/638,598

(22) Filed: Jun. 30, 2017

(65) Prior Publication Data

US 2018/0281171 A1 Oct. 4, 2018

(30) Foreign Application Priority Data

Mar. 30, 2017 (IN) .............................. 201741011517

(51) Int. Cl.
*B25J 9/00* (2006.01)
*B05B 1/08* (2006.01)
(Continued)

(52) U.S. Cl.
CPC .............. *B25J 9/0009* (2013.01); *B05B 1/08* (2013.01); *B25J 9/16* (2013.01); *B29C 64/00* (2017.08);
(Continued)

(58) Field of Classification Search
CPC ......... B25J 9/0009; B25J 9/16; B29C 64/209; B29C 64/00; B29C 64/20; G05B 19/4099;
(Continued)

(56) References Cited

U.S. PATENT DOCUMENTS 5,121,329 A * 6/1992 Crump .................... B22F 3/115
700/119
2004/0173528 A1* 9/2004 Herrington ............ B01D 61/04
210/637
(Continued)

FOREIGN PATENT DOCUMENTS

WO WO 2015/038072 3/2015

*Primary Examiner* — Michael M. Robinson
(74) *Attorney, Agent, or Firm* — Finnegan, Henderson, Farabow, Garrett & Dunner, LLP

(57) ABSTRACT

Disclosed is a robotic apparatus for building a multidimensional object. The apparatus includes extruder unit, support structure, plurality of motor units, and modeling platform. The extruder unit receives material to build multidimensional object. The extruder unit includes plurality of nozzles, and spring steel valve. The nozzles includes changeable orifices to extrude pre-defined patterns of materials. The spring steel valve isolates cross flow contamination of materials to allow positive extrusion of materials and restricts the backflow of materials. The extruder unit moves concurrently in forward and reverse direction while extruding materials. The support structure includes sides, and rails. The sides form outer surface of support structure. The rails are integrated with sides to form multidimensional path for extruder unit. The motor units control elevation and movement of extruder unit. The modeling platform is rotatable and provides build surface to support multidimensional object. The modeling platform moves in forward and reverse direction.

17 Claims, 25 Drawing Sheets

(51) Int. Cl.
- *B25J 9/16* (2006.01)
- *B33Y 30/00* (2015.01)
- *B33Y 80/00* (2015.01)
- *G05B 19/4099* (2006.01)
- *B29C 64/00* (2017.01)
- *B29C 64/209* (2017.01)

(52) U.S. Cl.
CPC ............ *B29C 64/209* (2017.08); *B33Y 30/00* (2014.12); *B33Y 80/00* (2014.12); *G05B 19/4099* (2013.01); *B01L 2400/0605* (2013.01)

(58) Field of Classification Search
CPC ........... B33Y 80/00; B33Y 30/00; B05B 1/08; B01L 2400/0605
See application file for complete search history.

(56) References Cited

U.S. PATENT DOCUMENTS

| | | | | |
|---|---|---|---|---|
| 2005/0015175 | A1* | 1/2005 | Huang | B29C 41/02 700/121 |
| 2008/0170112 | A1* | 7/2008 | Hull | B29C 64/124 347/127 |
| 2009/0035405 | A1* | 2/2009 | Leavitt | B28B 1/14 425/97 |
| 2014/0015172 | A1* | 1/2014 | Sidhu | B28B 1/001 264/497 |
| 2014/0120196 | A1* | 5/2014 | Schmehl | B33Y 30/00 425/190 |
| 2015/0100149 | A1* | 4/2015 | Coeck | G01S 5/16 700/120 |
| 2016/0136897 | A1* | 5/2016 | Nielsen-Cole | B29B 7/90 425/131.1 |
| 2016/0297104 | A1* | 10/2016 | Guillemette | B29B 11/16 |

* cited by examiner

ROBOTIC APPARATUS FOR BUILDING A MULTIDIMENSIONAL OBJECT

TECHNICAL FIELD

The present invention is generally related to an apparatus for building multidimensional objects, particularly to an extruder unit using plurality of changeable orifices to extrude pre-defined patterns of materials.

BACKGROUND

Currently, 3-Dimensional (3D) Computer Aided Drafting (CAD) models are used in conjunction with the 3D manufacturing apparatus for the purpose of manufacturing prototypes. Existing, 3D apparatuses for building multidimensional objects are majorly of two categories. The first apparatus is a CNC machine which removes or cuts the material from a solid block of material and the solid block is clamped in place within the CNC machine and material is cut away until the remaining material represents the CAD geometry supplied to the CNC machine.

The second apparatus is pertaining to an additive process where the 3D-CAD model is cut into layers in software and the 3D object is built layer by layer within a build plane until the desired geometry represents the 3D object in the CAD model. The 3D manufacturing apparatus builds the 3D object by adhering a layer of material to a modeling platform then by adhering each consecutive layer to the previous layer in a plane parallel to the modeling platform within the 3D manufacturing apparatus until the 3D object's geometry matches the 3D CAD geometry provided to the 3D Printer. The user may feed a design through the computer and this 3D manufacturing apparatus produces a physical object of the received design. Further, the user may scan the object through a 3D scanner and send the file to the 3D manufacturing apparatus via a computer and then the 3D manufacturing apparatus may produce plurality of such scanned objects.

However, the aforementioned 3D manufacturing apparatuses have their own limitations such as these apparatuses are unable to extrude pre-defined patterns of various materials through changeable orifices. Existing 3D manufacturing apparatuses fail to provide very low cost manufacturing operations, prototypes, display objects, and 3D objects. Additionally, for fused filament fabrication, the existing 3D manufacturing apparatuses fail to provide an increased printing speed, printing with multiple materials, and lower printer costs.

Further limitations and disadvantages of conventional and traditional approaches will become apparent to one of skill in the art through comparison of described systems with some aspects of the present disclosure, as set forth in the remainder of the present application and with reference to the drawings.

SUMMARY OF THE INVENTION

A robotic apparatus is provided substantially, as shown in and/or described in connection with at least one of the figures, as set forth more completely in the claims.

According to the embodiments illustrated herein, a robotic apparatus for building a multidimensional object is provided. The apparatus includes an extruder unit, a support structure, a plurality of motor units, and a modeling platform. The extruder unit receives a plurality of materials to build the multidimensional object. The extruder unit includes a plurality of nozzles, and a spring steel valve. The plurality of nozzles includes a plurality of changeable orifices to extrude pre-defined patterns of the plurality of materials.

The spring steel valve isolates the cross-flow contamination of the plurality of materials to allow a positive extrusion of the materials and further restricts the backflow of the materials. In an embodiment, the extruder unit is capable to move concurrently in a forward direction and a reverse direction while extruding the plurality of materials.

The support structure includes a plurality of sides, and a plurality of rails. The plurality of sides form outer surface of the support structure. The plurality of rails integrated with the sides form a multidimensional path for the extruder unit. The plurality of motor units electrically configured with the plurality of the rails to control the elevation of the extruder unit.

In an embodiment, the motor unit further configured with the extruder unit to control the movement while building the multidimensional object. The modeling platform provides a build surface to support the multidimensional object while building the multidimensional object. In an embodiment, the modeling platform is rotatable to a pre-defined degree, and capable to move in a forward direction and a reverse direction.

These features and advantages of the present disclosure may be appreciated by reviewing the following description of the present disclosure, along with the accompanying figures wherein like reference numerals refer to like parts.

BRIEF DESCRIPTION OF DRAWINGS

The accompanying drawings illustrate the embodiments of systems, methods, and other aspects of the disclosure. Any person with ordinary skills in the art will appreciate that the illustrated element boundaries (e.g., boxes, groups of boxes, or other shapes) in the figures represent an example of the boundaries. In some examples, one element may be designed as multiple elements, or multiple elements may be designed as one element. In some examples, an element shown as an internal component of one element may be implemented as an external component in another, and vice versa. Furthermore, the elements may not be drawn to scale.

Various embodiments will hereinafter be described in accordance with the appended drawings, which are provided to illustrate, not limit, the scope, wherein similar designations denote similar elements, and in which.

DETAILED DESCRIPTION

Figure 1:
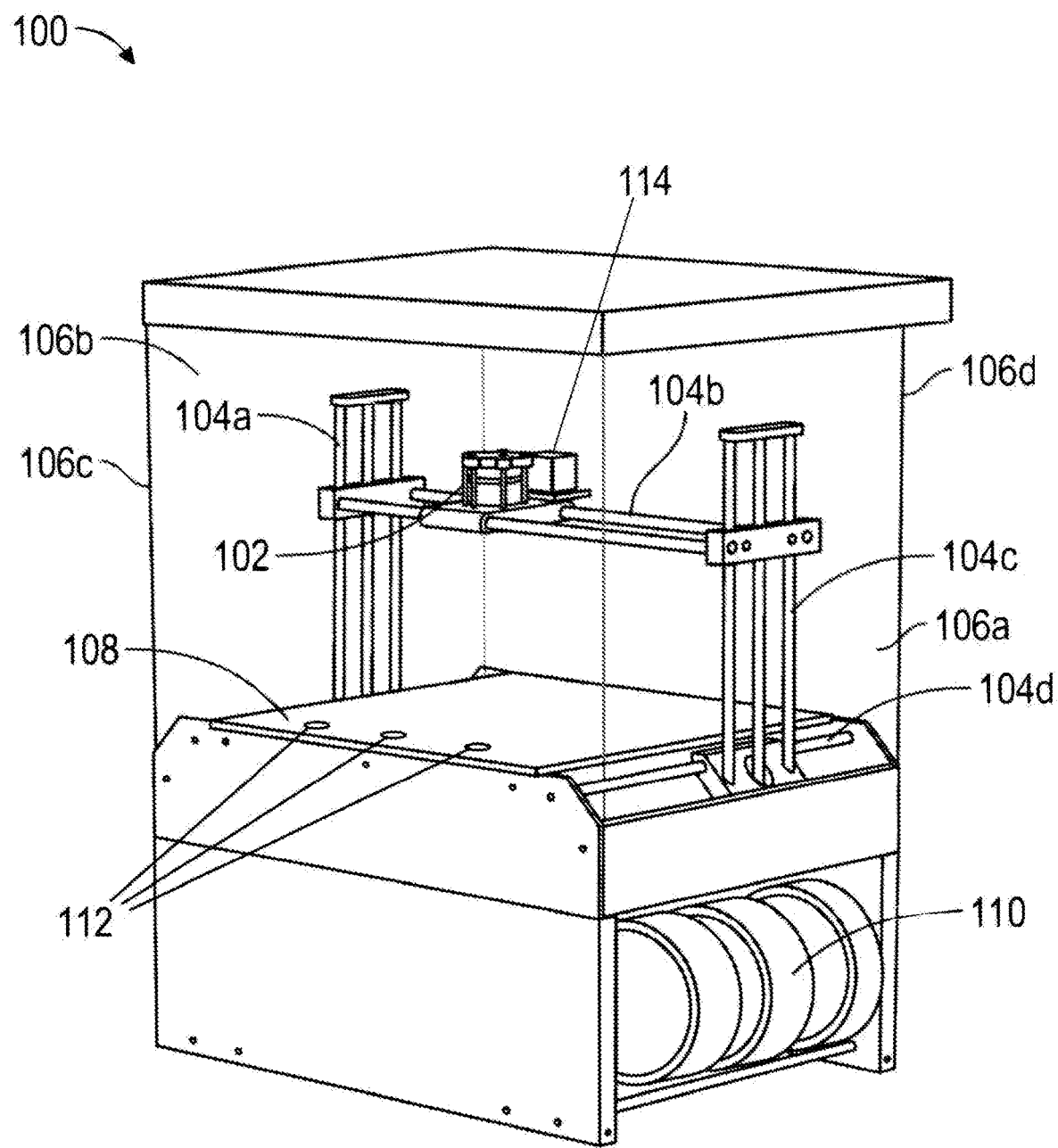
FIG. 1 illustrates a general view of the robotic apparatus for building a multidimensional object, in accordance with at least one embodiment.

The present disclosure is best understood with reference to the detailed figures and description set forth herein. Various embodiments have been discussed with reference to the figures. However, those skilled in the art will readily appreciate that the detailed descriptions provided herein with respect to the figures are merely for explanatory purposes, as the methods and systems may extend beyond the described embodiments. For instance, the teachings presented and the needs of a particular application may yield multiple alternative and suitable approaches to implement the functionality of any detail described herein. Therefore, any approach may extend beyond certain implementation choices in the following embodiments.

References to "one embodiment", "at least one embodiment", "an embodiment", "one example", "an example", "for example", and so on indicate that the embodiment(s) or example(s) may include a particular feature, structure, characteristic, property, element, or limitation, but not every embodiment or example necessarily includes that particular feature, structure, characteristic, property, element, or limitation. Furthermore, repeated use of the phrase "in an embodiment" does not necessarily refer to the same embodiment.

Unless defined otherwise, all technical and scientific terms used herein have the same meaning as commonly understood by one of the ordinary skills in the art to which this invention belongs. Although any method and material similar or equivalent to those described herein can also be used in the practice or testing of the present invention, the preferred methods and materials have been described. All publications, patents, and patent applications mentioned herein are incorporated in their entirety.

It is noted that as used herein and in the appended claims, the singular forms "a", "and", and "the" include plural referents, unless the context clearly dictates otherwise. In the claims, the terms "first", "second", and so forth are to be interpreted merely as ordinal designations; they shall not be limited in themselves. Furthermore, the use of exclusive terminology such as "solely", "only", and the like in connection with the recitation of any claim element is contemplated. It is also contemplated that any element indicated to be optional herein may be specifically excluded from a given claim by way of a "negative" limitation. Finally, it is contemplated that any optional feature of the inventive variation(s) described herein may be set forth and claimed independently or in combination with any one or more of the features described herein.

All references cited herein, including publications, patent applications, and patents, are hereby incorporated by reference to the same extent as if each reference were individually and specifically indicated to be incorporated by reference, and were set forth in its entirety herein.

The recitation of ranges of values herein is merely intended to serve as a shorthand method of referring individually to each separate value falling within the range, unless otherwise indicated herein, and each separate value is incorporated into the specification as if it were individually recited herein.

FIG. 1 illustrates a general view of the robotic apparatus 100 for building a multidimensional object, in accordance with at least one embodiment. The apparatus 100 includes an extruder unit 102, a support structure 104a, 104b, 104c, 104d, and 106, a plurality of motor units 200 (shown and explained in conjunction with FIGS. 2-4), and a modeling platform 108.

The extruder unit 102 receives a plurality of materials from the solid filament hub 110 to build the multidimensional object. The extruder unit 102 includes a plurality of nozzles 702a-702f (shown and explained in conjunction with FIG. 7 and FIGS. 21-24), and a spring steel valve 1502 (shown and explained in conjunction with FIG. 23). The extruder unit 102 consists of two sections: a top section which is cold to feed the material such as plastic filament, and a bottom section which is hot that melts and extrudes the plurality of materials. In an embodiment, the plurality of materials includes metals, polymers, ABS, HDPE, PLA, PVA, and composites doped with wood and carbon Nano-tubes.

The hot-section includes plurality of components such as a thermistor to measure the temperature, a heat barrier to separate the hot-section from the cold-section, and the nozzle where the melted material such as plastic flows out of the heater barrel. Examples of the material includes but not limited to thermoplastic (e.g. ABS, HDPE, PLA, PVA) a metal, polymers and composites doped with secondary materials such as wood and carbon Nano-tubes to create models, prototypes, patterns, and production parts.

The plurality of nozzles 702a-702f includes a plurality of changeable orifices to extrude pre-defined patterns of the plurality of materials. The plurality of changeable orifices has pre-defined output geometry dies for extruding defined patterns through layering distribution. While distributing the materials the extruder unit 102 may turn to create a 360 degree of freedom pattern by keeping nozzle output within a defined pattern with outside and inside patterns effective without crossing materials.

The spring steel valve 1502 (shown in FIG. 15) isolates the cross-flow contamination of the plurality of materials to allow a positive extrusion of the materials and further restricts the backflow of the materials. In an embodiment, the extruder unit 102 is configured to move concurrently in a forward direction and a reverse direction while extruding the plurality of materials.

The support structure includes a plurality of sides 106*a*, 106*b*, 106*c*, and 106*d*, and a plurality of rails 104*a*, 104*b*, 104*c*, and 104*d*. The plurality of sides 106*a*, 106*b*, 106*c*, and 106*d* form outer surface of the support structure. The plurality of rails 104*a*, 104*b*, 104*c*, and 104*d* are integrated with the sides to form a multidimensional path for the extruder unit 102.

The plurality of motor units 200 electrically configured with the plurality of the rails 104*a*, 104*b*, 104*c*, and 104*d* in order to control the elevation of the extruder unit 102. Further, the plurality of motor units 200 (200*a*, 200*b*, and 200*c*) configured with the extruder unit 102 utilizes a combination of a peristaltic pump, and a solid filament drive for movement of the changeable orifices. In an embodiment, the motor unit 200 is further configured with the extruder unit 102 to control the movement of the extruder unit 102 while building the multidimensional object.

The plurality of sides 106*a*, 106*b*, 106*c*, and 106*d*, and a plurality of rails 104*a*, 104*b*, 104*c*, and 104*d* acts as an opposing fixture for the robotic apparatus 100. The opposing fixture may have a rotating multidimensional axis base to allow distribution of materials through a pre-defined three dimensional motion of freedom.

Further, the robotic apparatus 100 may have various external attachments along with internal attachments such as a robotic arm to control motion and delivery of products in and out of material's construction area for retrieval and placement of component assembly.

In an embodiment, the support structure is constructed with nine rails used as elevator control for three-dimensional construction. The use of three rails maintains a linear plane and the six rails allow for multi-dimensional plane construction and distribution of materials. The support structure forms a frame cabinet to enclose the robotic apparatus 100 for vacuum space and limitation for ambient air inclusion.

Further, the inert gases may be managed by sealing the framework to restrict or control outside contaminants. The frame cabinet may have temperature control for inside environment control. Additionally, the frame cabinet control center may have an inlet and exhaust control for caustic fumes generated from dispersed materials. In an embodiment, the frame cabinet control center may include a mechanism for ultra violet glass protection.

Further, the frame cabinet may include a plurality of doors for ease of access, a lock, and an electrical switch that may trigger a relay when opened for an alarm and terminate the motion within the frame cabinet. As mentioned above, the frame cabinet includes plurality of rail elevators to control the delta configuration of the extruder unit 102. In an embodiment, the delta configuration file may have a .h extension.

The frame cabinet includes a predetermined rail placement. The frame cabinet having orifices to allow tubing to pass through for material distribution. The frame cabinet having placement for motor drivers. The frame cabinet includes placement to configure with the computers.

Furthermore, each dispensing nozzle may distribute liquid materials at variation of temperatures and material states. The defined state of materials may be solid, liquid or gas. The multidimensional construction of materials may be dispensed into a predefined structure. The disbursement of materials may be liquid and cured by light.

The disbursement of materials may be liquid and fused by heat using a laser. The disbursement of materials may be used as support materials and support extruded materials. The extrusion of materials may be used to create a container and specific dosage may be dispensed into container and closed using the container materials.

The modeling platform 108 provides a build surface to support the multidimensional object while building the multidimensional object. In an embodiment, the modeling platform 108 is rotatable to a pre-defined degree, and capable to move in a forward direction and a reverse direction. The modeling platform 108 includes a centrifugal internal pump for extruding the plurality of materials, and decontamination. In an embodiment, the modeling platform 108 is configure to rotate 120 degrees and further change the extrusion dies.

The modeling platform 108 may be heated while operation. The modeling platform 108 may include vacuum orifices (e.g., vacuum orifices 112 of FIG. 1) to draw emitted gases and exhaust to controlled atmosphere. The modeling platform 108 may be removed and replaced with prebuilt objects for concluding fabrication of extruded materials. The extruded materials may be sliced and dropped to form the multidimensional object. The multiple extruded materials may be combined and distributed through a single extrusion nozzle.

The robotic apparatus 100 further includes a cooling mechanism (e.g., cooling mechanism 114 of FIG. 1) placed in the vicinity of the extruder unit 102 to decrease the temperature of the built multidimensional object. In an embodiment, the cooling mechanism may be a recirculating liquid housed in a container and placed in the vicinity of extruder unit 102 to control the temperature of the built multidimensional object. Further, in an embodiment, a cooling fluid may be circulated in the vicinity of the plurality of nozzles to control the temperature of each of the plurality of nozzles.

The built multidimensional object may have hollow cavities produced by voided layering methods. The constructed object may include electronics and sensors. Further, the robotic apparatus 100 may be utilized for extruding, laser cutting, rotary cutting and molding of plurality of materials simultaneously or for singular disbursement.

Figure 2:
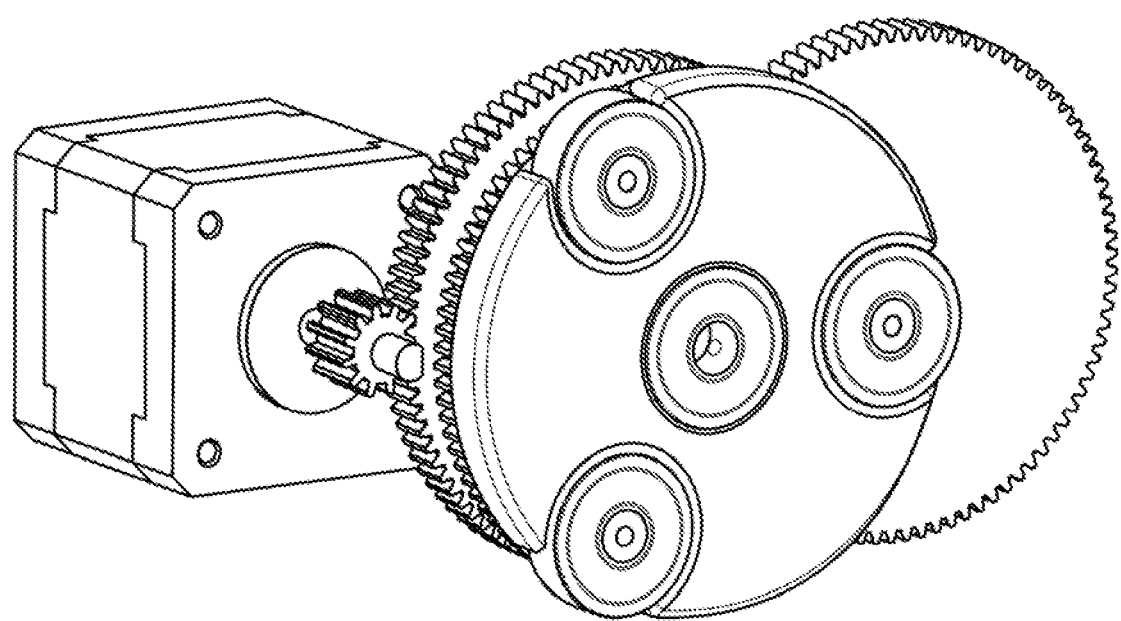
FIG. 2 illustrates an exploded view of the motor unit, in accordance with at least one embodiment.
Figure 3:
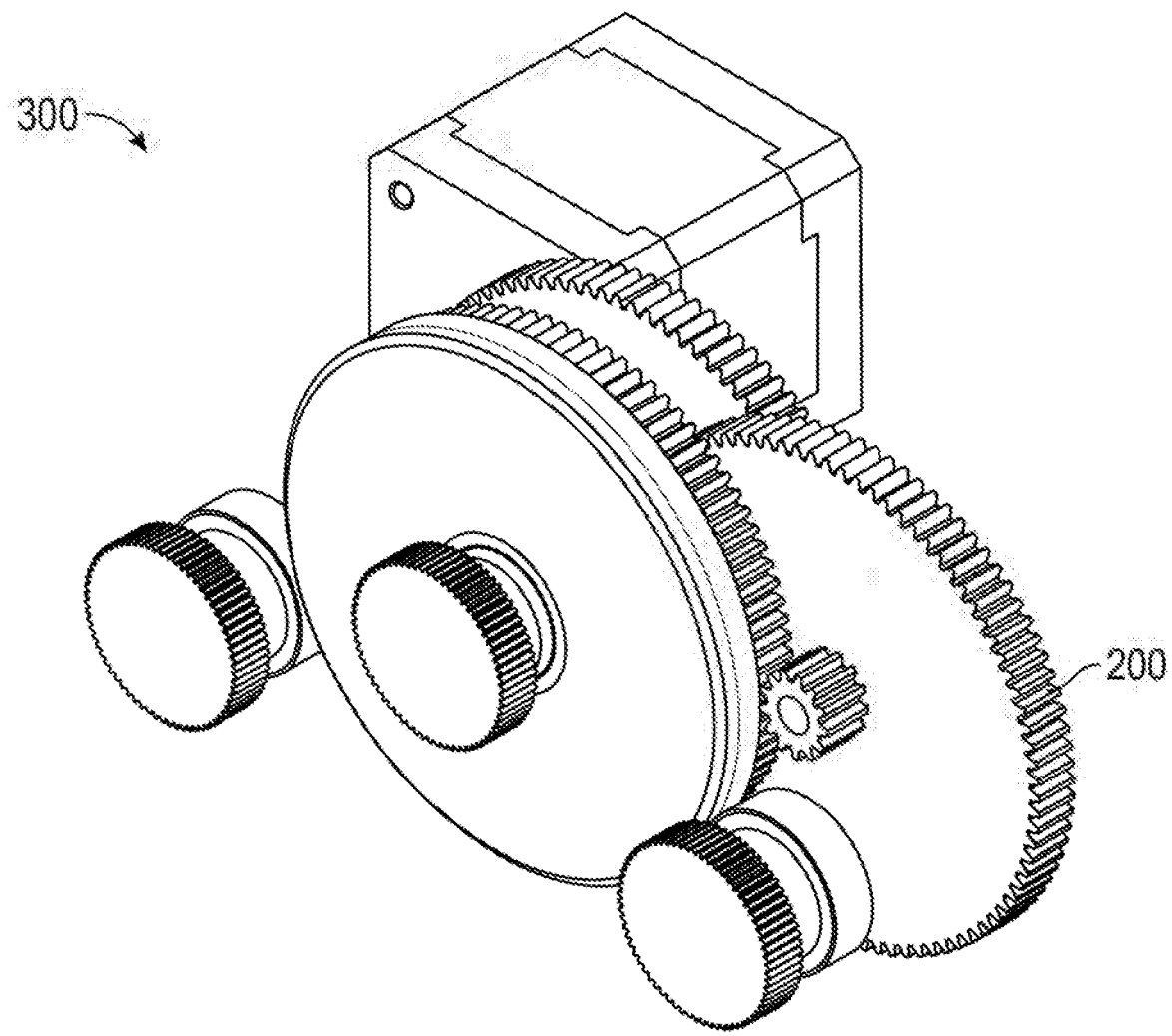
FIG. 3 illustrates a fragmentary axial section view of the motor unit, in accordance with at least one embodiment.
Figure 4:
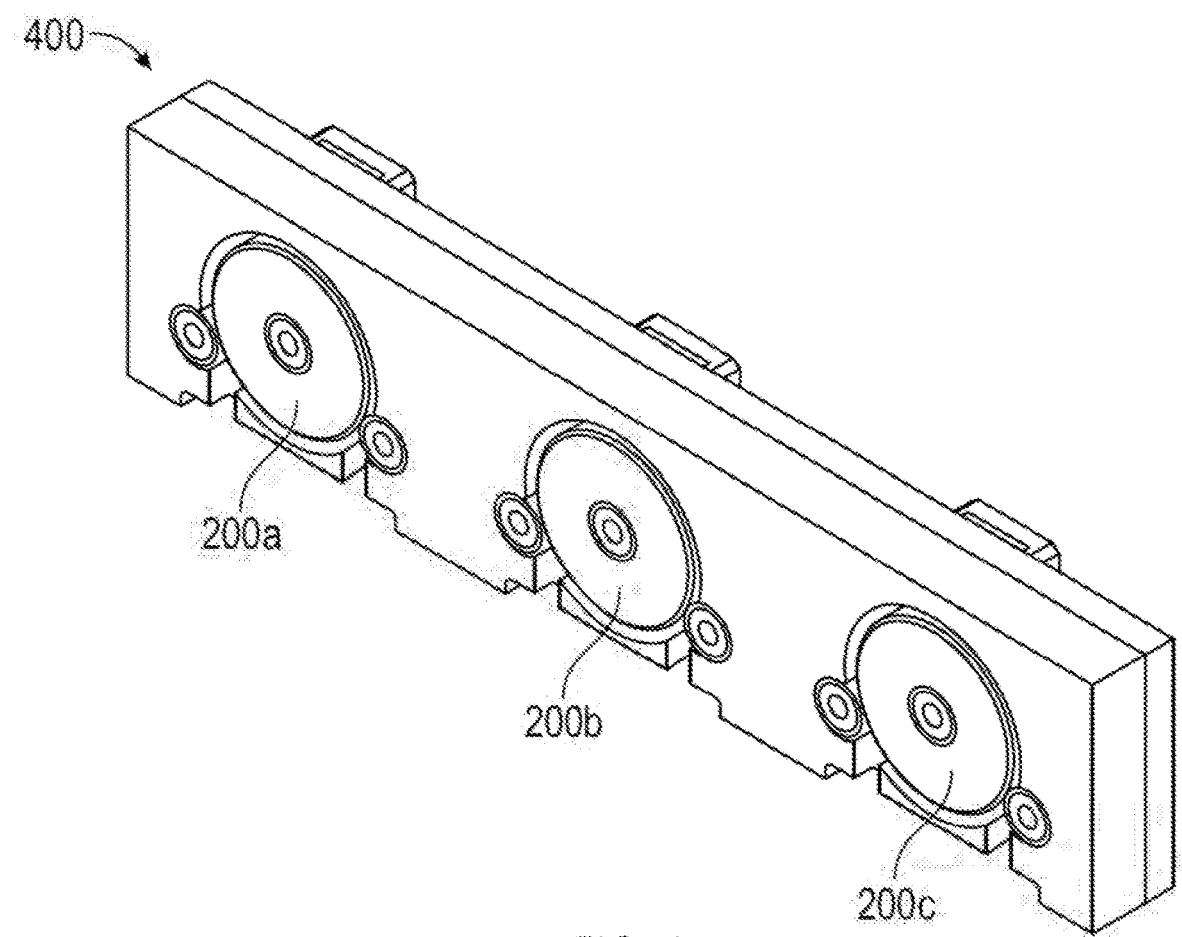
FIG. 4 illustrates an assembled view of the motor array units, in accordance with at least one embodiment.

FIG. 2 illustrates an exploded view of the motor unit 200, in accordance with at least one embodiment. FIG. 3 illustrates a fragmentary axial section view 300 of the motor unit 200, in accordance with at least one embodiment. FIG. 4 illustrates an assembled view 400 of the motor array units 200*a*, 200*b*, and 200*c*, in accordance with at least one embodiment. The FIG. 4 illustrates the gear train with peristaltic hub configuration. In an embodiment, the motor unit 200 is a stepper motor. The plurality of stepper motors is used to control the movement of the extruder unit 102 along the plurality of rails in X-axis, Y-axis, and Z-axis direction. The robotic apparatus 100 is designed to use bipolar NEMA 17 motors. The NEMA 17 determines the dimensions of the stepper motors.

Figure 5:
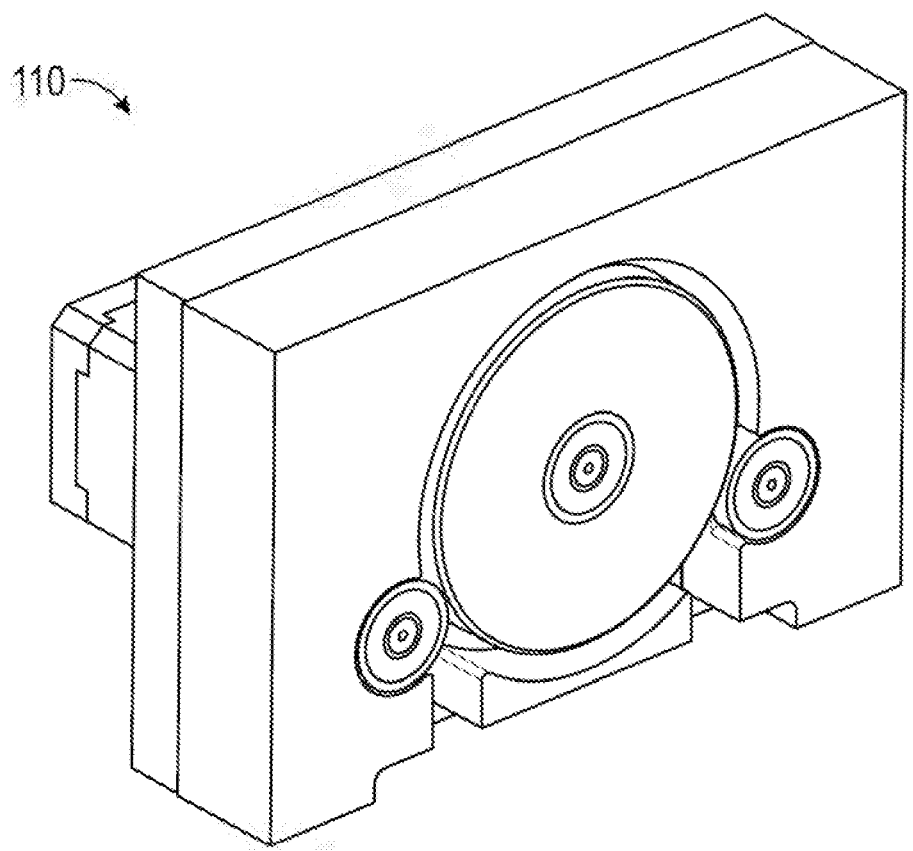
FIG. 5 illustrates a solid filament hub, in accordance with at least one embodiment.

FIG. 5 illustrates a solid filament hub 110, in accordance with at least one embodiment. There are various sizes of the filament available such as 3 mm wide and 1.75 mm wide. The hole drilled in the heater barrel has to match the size of the filament. At the tip of the heat barrel the exit hole narrows down to less than 1 mm (typically 0.5 mm.)

Figure 6:
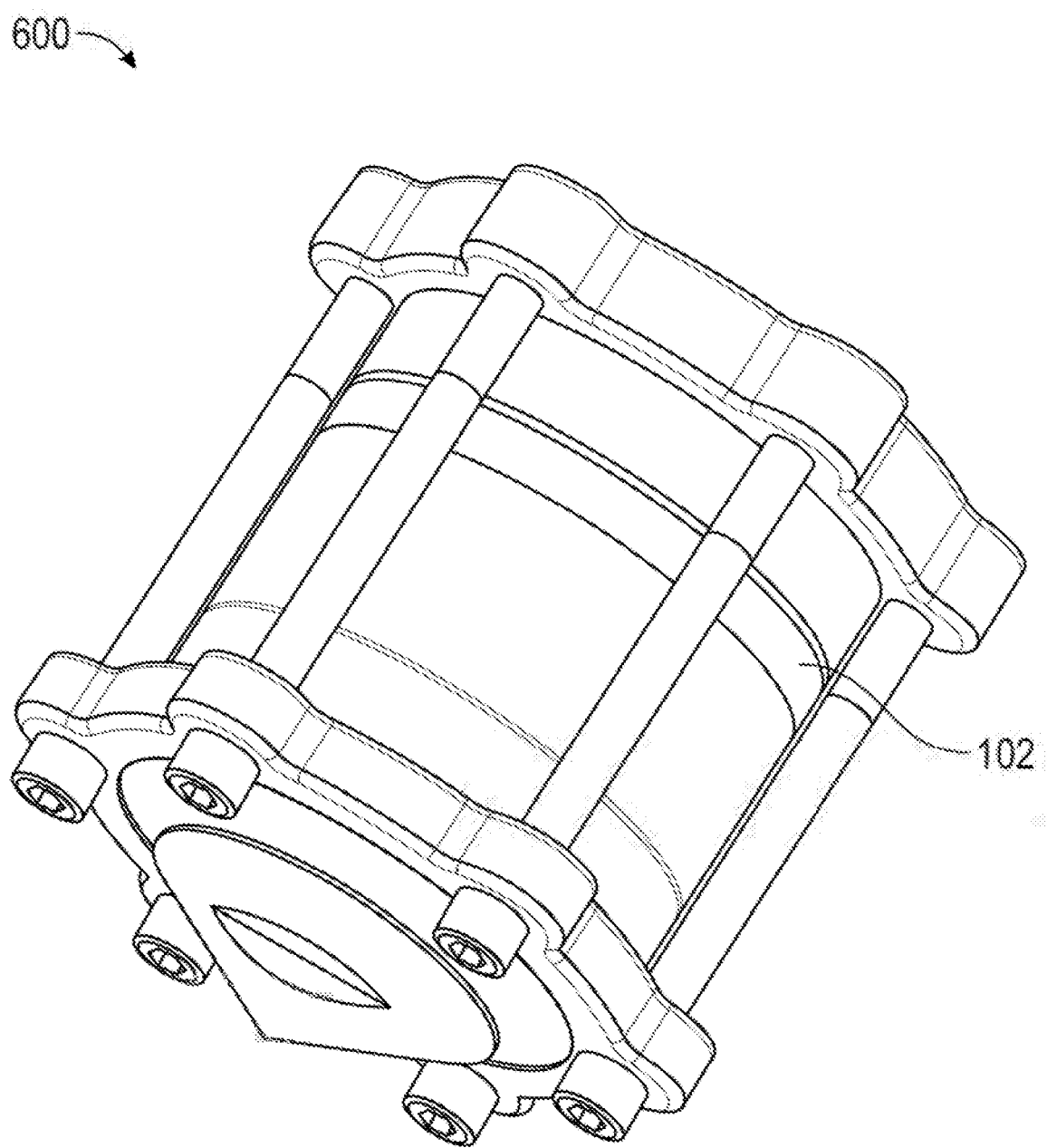
FIG. 6 illustrates an side view of the extruder unit, in accordance with at least one embodiment.
Figure 7:
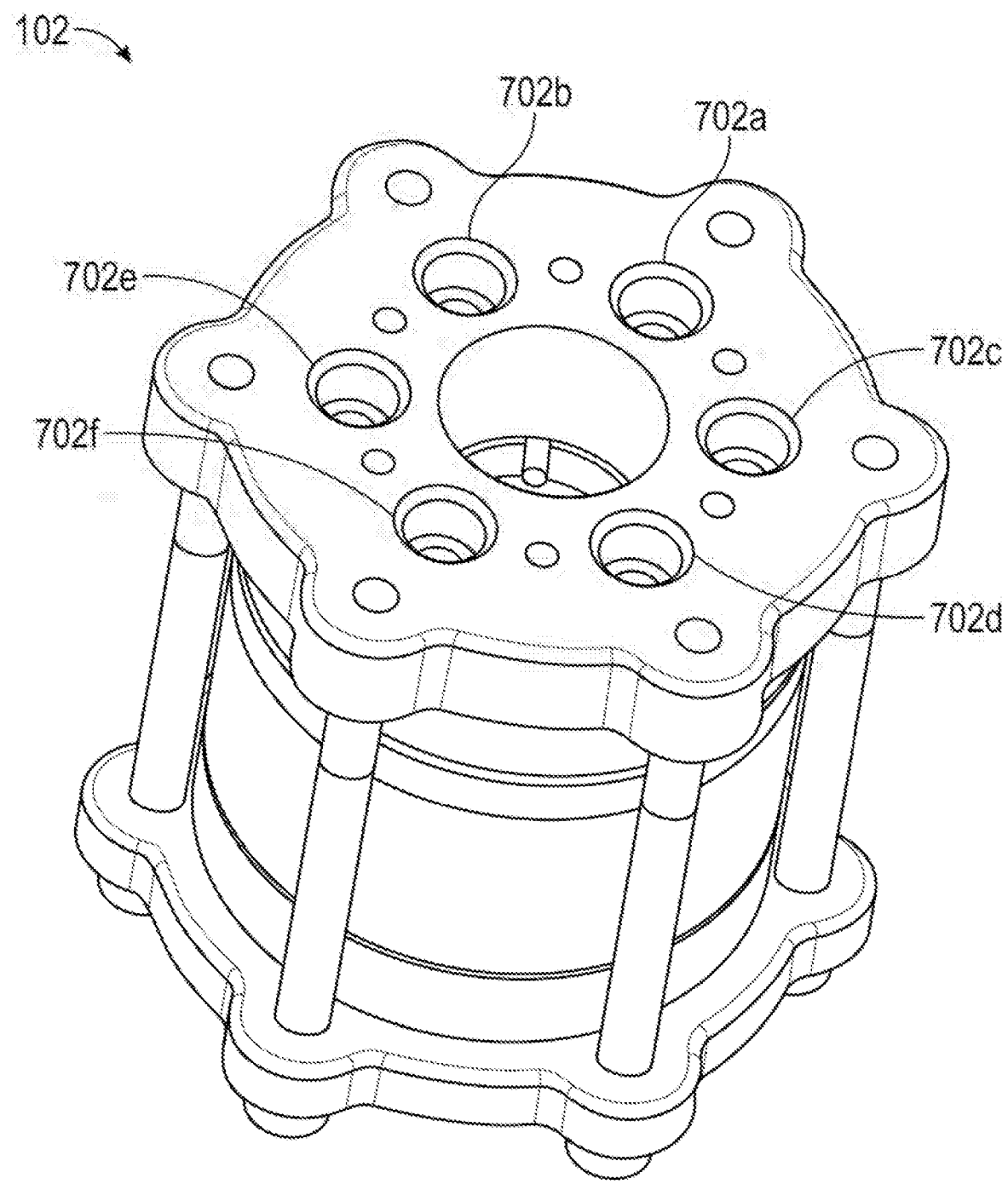
FIG. 7 illustrates an exemplary view of the extruder unit, in accordance with at least one embodiment.

FIG. 6 illustrates a side view 600 of the extruder unit 102, in accordance with at least one embodiment. FIG. 7 illustrates an exemplary view 700 of the extruder unit 102, in accordance with at least one embodiment. The extruder unit 102 turns to create a 360 degree of freedom pattern by keeping nozzle output within a defined pattern with outside and inside patterns effective without crossing materials during distributing the materials. The plurality of nozzles 702a, 702b, 702c, 702d, 702e, and 702f include a plurality of changeable orifices to extrude pre-defined patterns of the plurality of materials. The plurality of changeable orifices has a pre-defined output geometry dies for extruding defined patterns through layering distribution.

Figure 8:
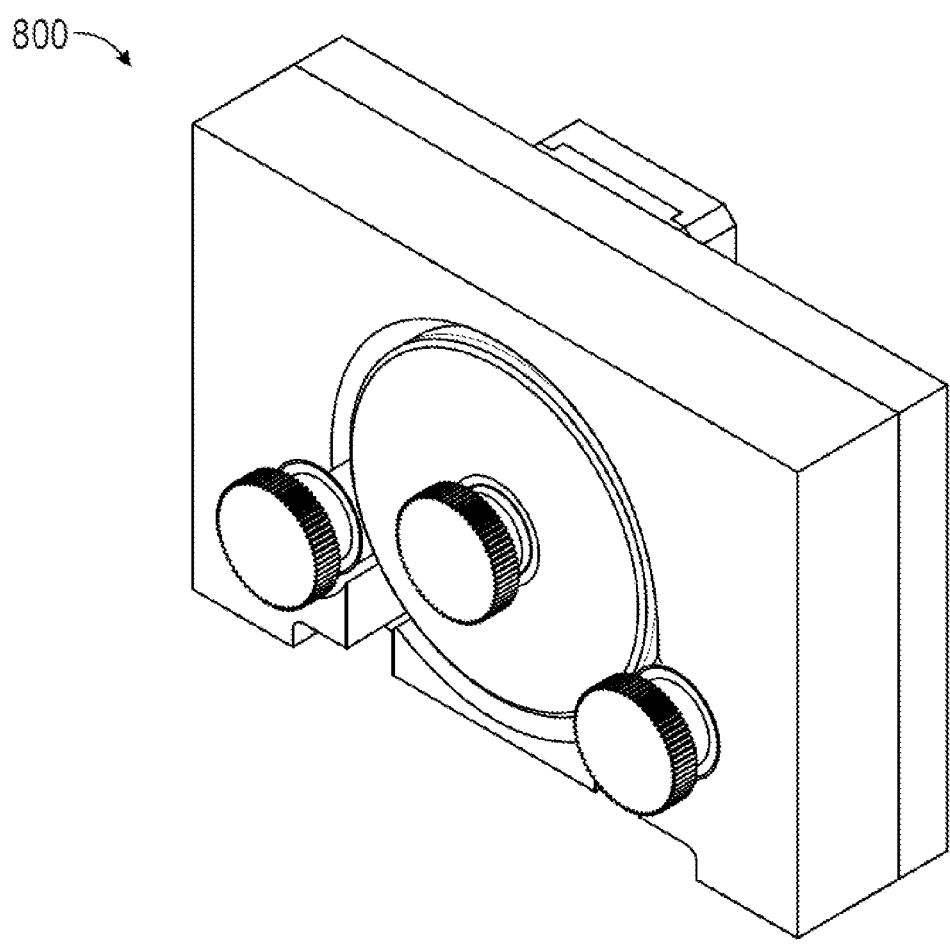
FIG. 8 illustrates an operational view of the extruder feed, in accordance with at least one embodiment.
Figure 9:
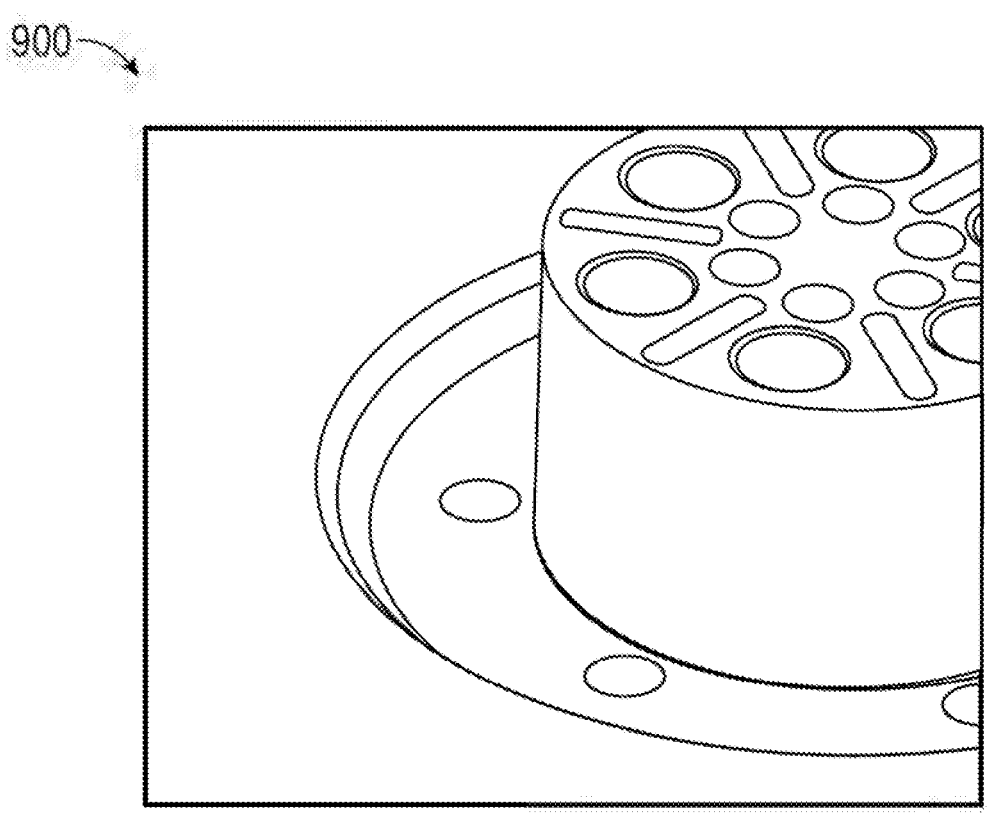
FIG. 9 illustrates an exemplary view of the base bearing groove, in accordance with at least one embodiment.
Figure 10:
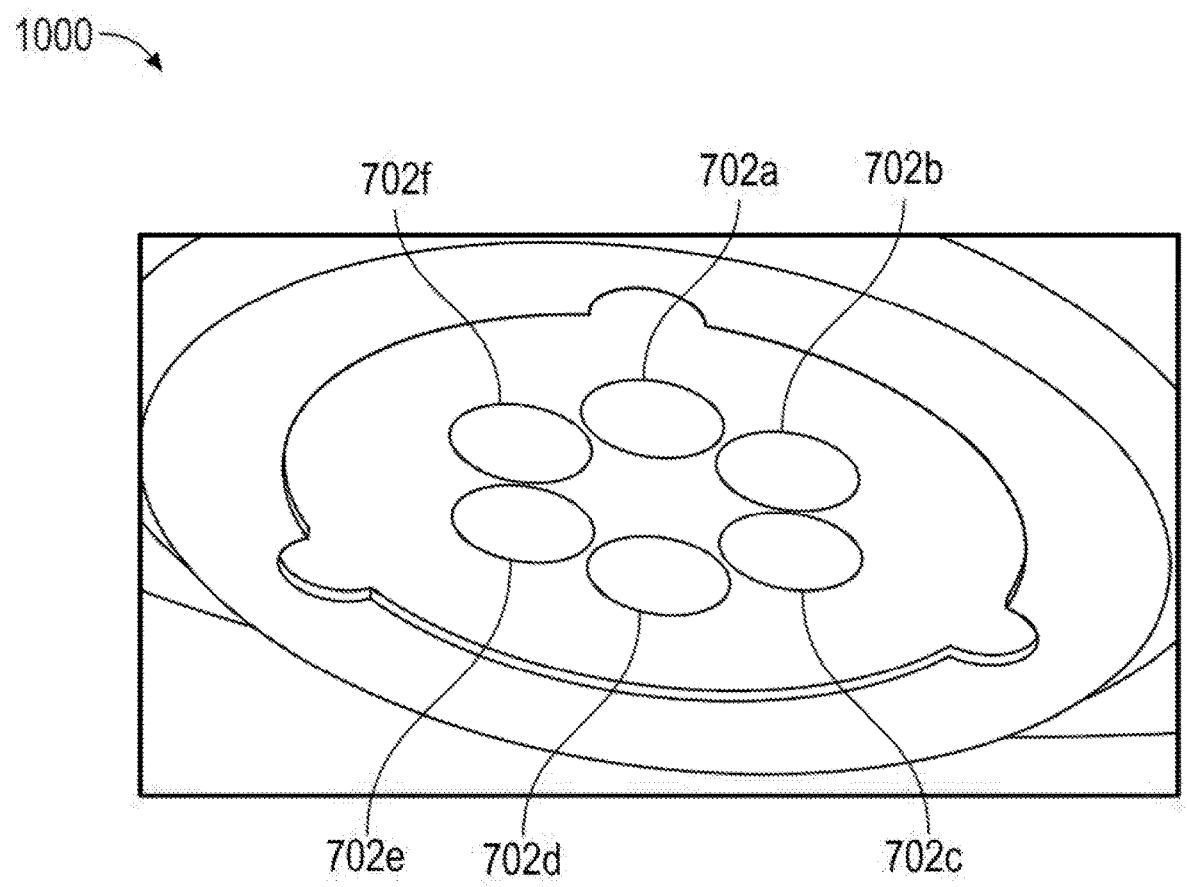
FIG. 10 illustrates an exemplary view of the recessed check valve, in accordance with at least one embodiment.

FIG. 8 illustrates an operational view 800 of the extruder feed, in accordance with at least one embodiment. FIG. 9 illustrates an exemplary view 900 of the base bearing groove, in accordance with at least one embodiment. FIG. 10 illustrates an exemplary view 1000 of the recessed check valve, in accordance with at least one embodiment. Each of the recessed check valves are fitted with the plurality of nozzles 702a, 702b, 702c, 702d, 702e, and 702f that further include the plurality of changeable orifices for extruding pre-defined patterns.

Figure 11:
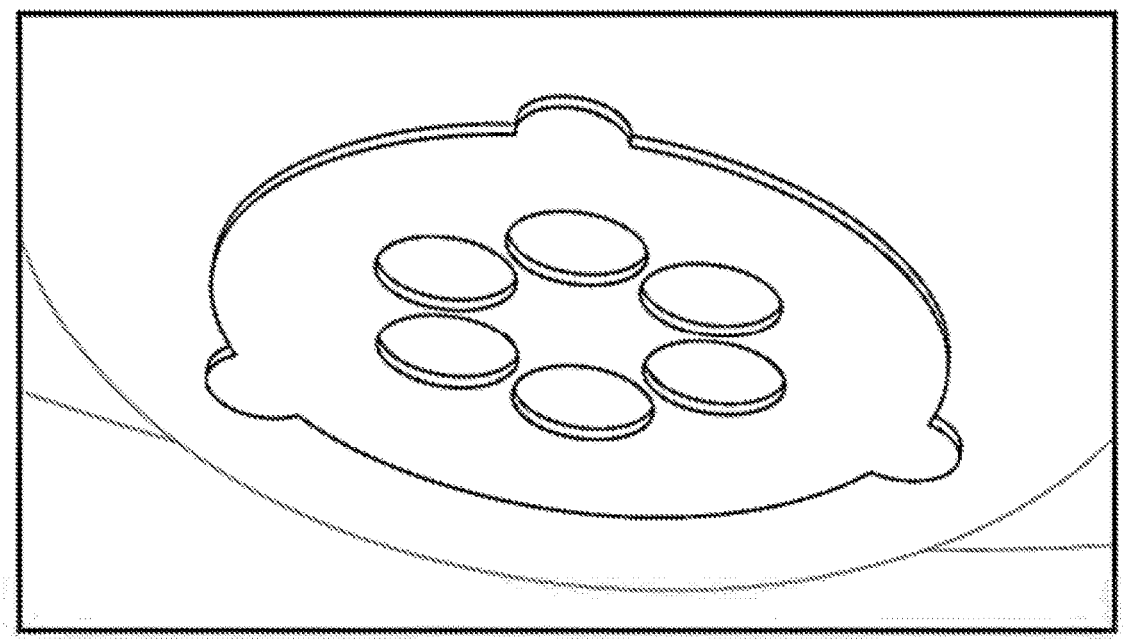
FIG. 11 illustrates an exemplary view of the check valve pass through, in accordance with at least one embodiment.
Figure 12:
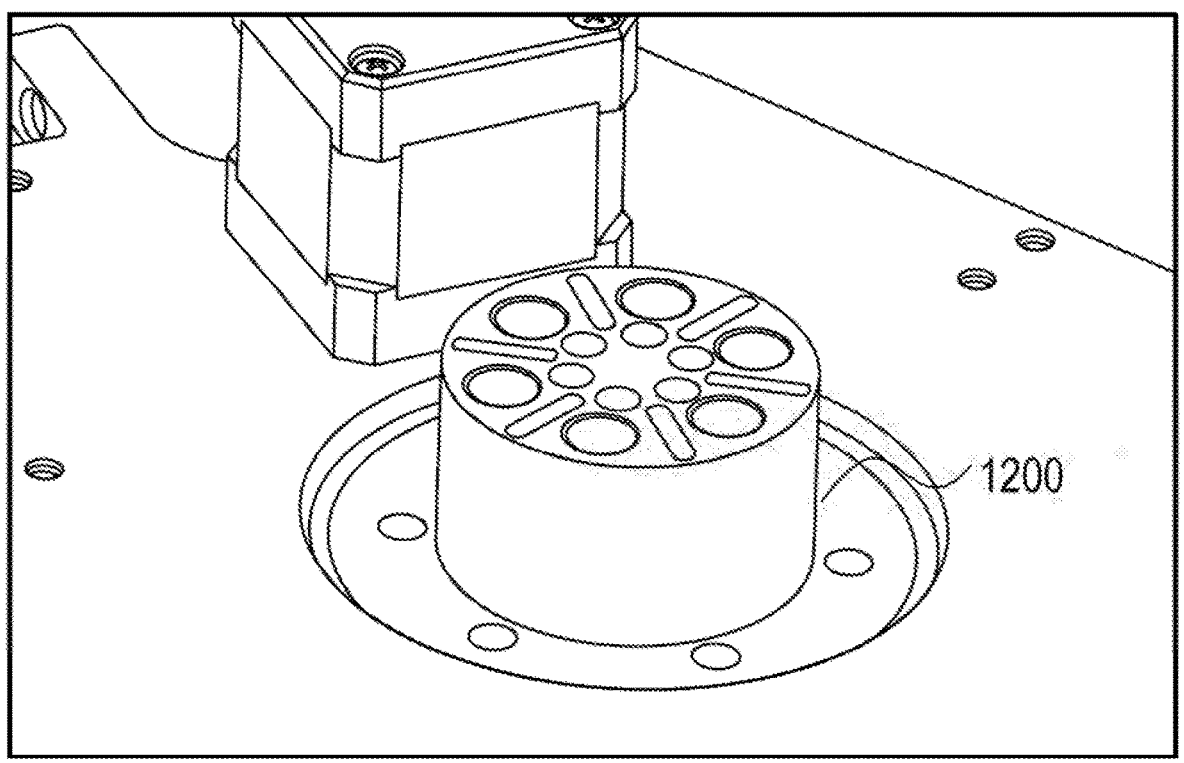
FIG. 12 illustrates thermal head of the extruder unit, in accordance with at least one embodiment.
Figure 13:
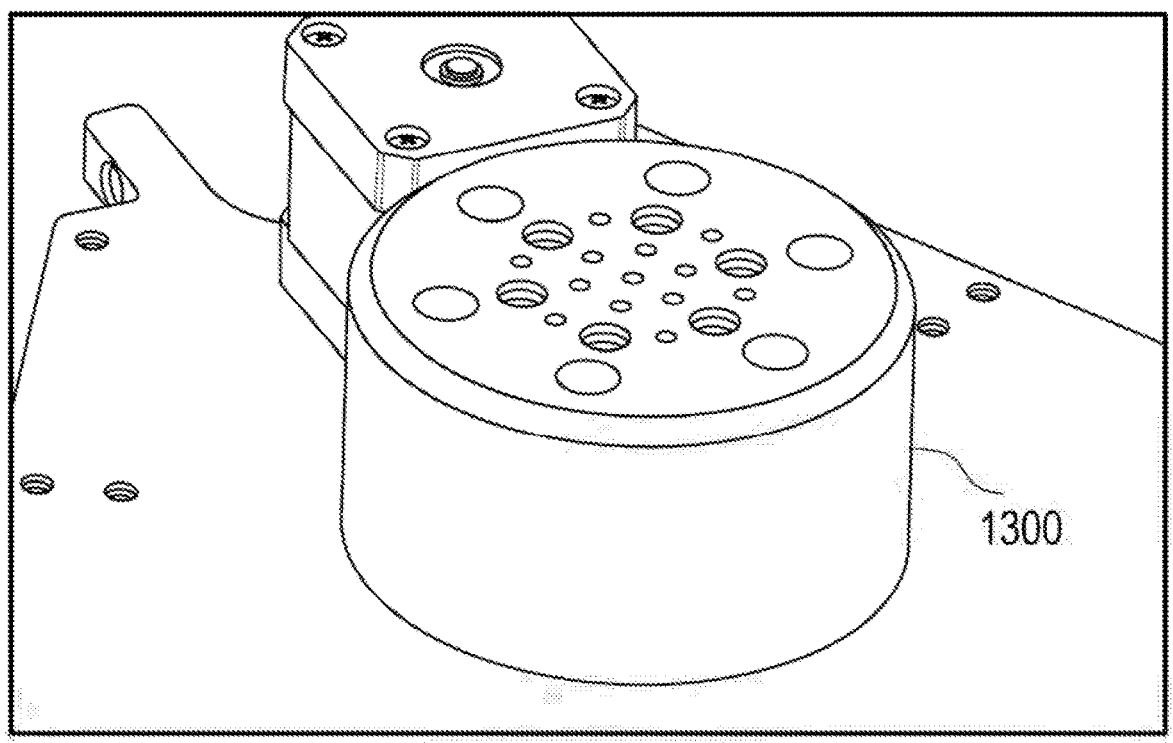
FIG. 13 illustrates thermal isolation head of the extruder unit, in accordance with at least one embodiment.

FIG. 11 illustrates an exemplary view 1100 of the check valve pass through, in accordance with at least one embodiment. FIG. 12 illustrates thermal head 1200 of the extruder unit 102, in accordance with at least one embodiment. FIG. 13 illustrates thermal isolation head 1300 of the extruder unit 102, in accordance with at least one embodiment.

Figure 14:
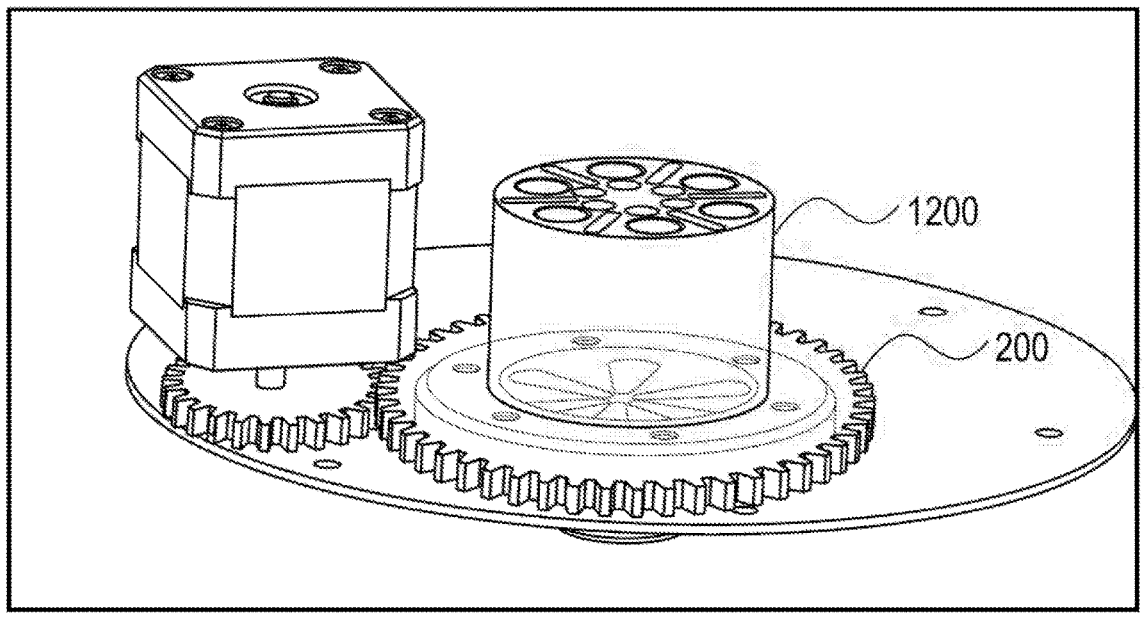
FIG. 14 illustrates an exemplary view of the gear drive, in accordance with at least one embodiment.
Figure 15:
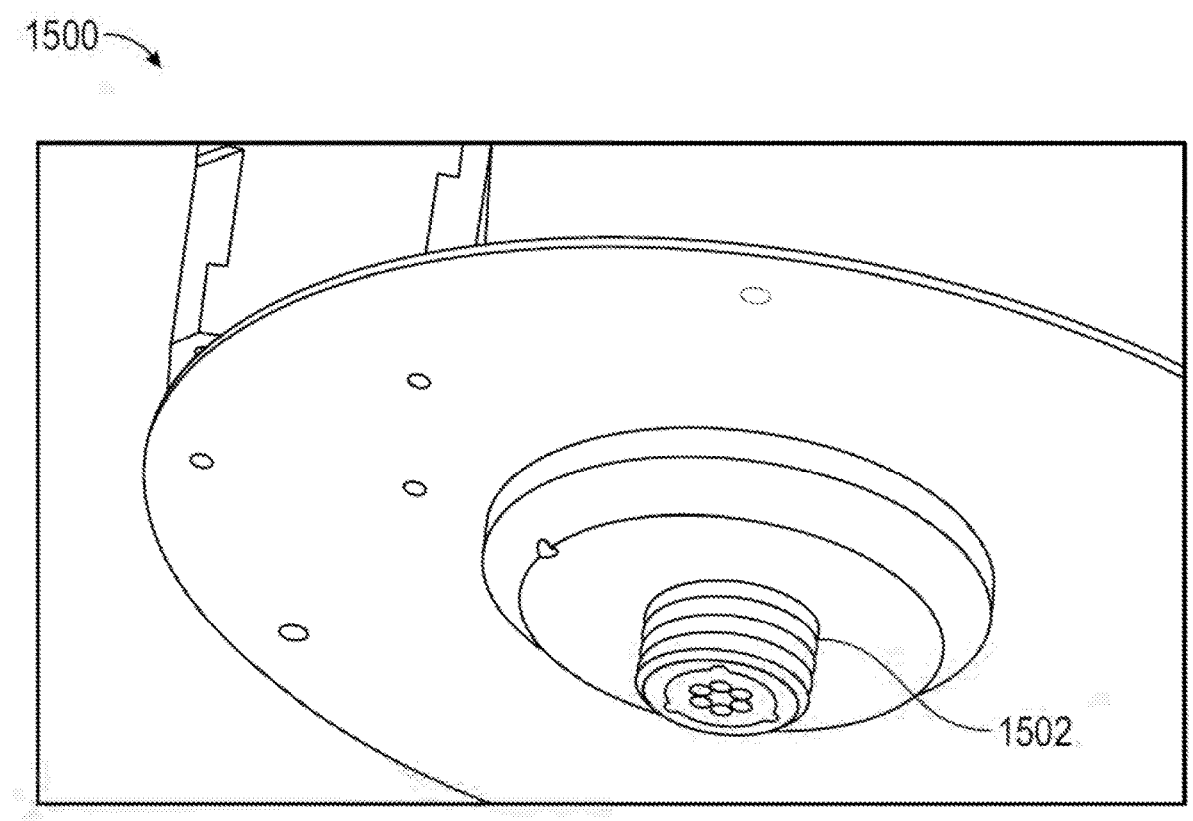
FIG. 15 illustrates lower view of the gear drive, in accordance with at least one embodiment.
Figure 16:
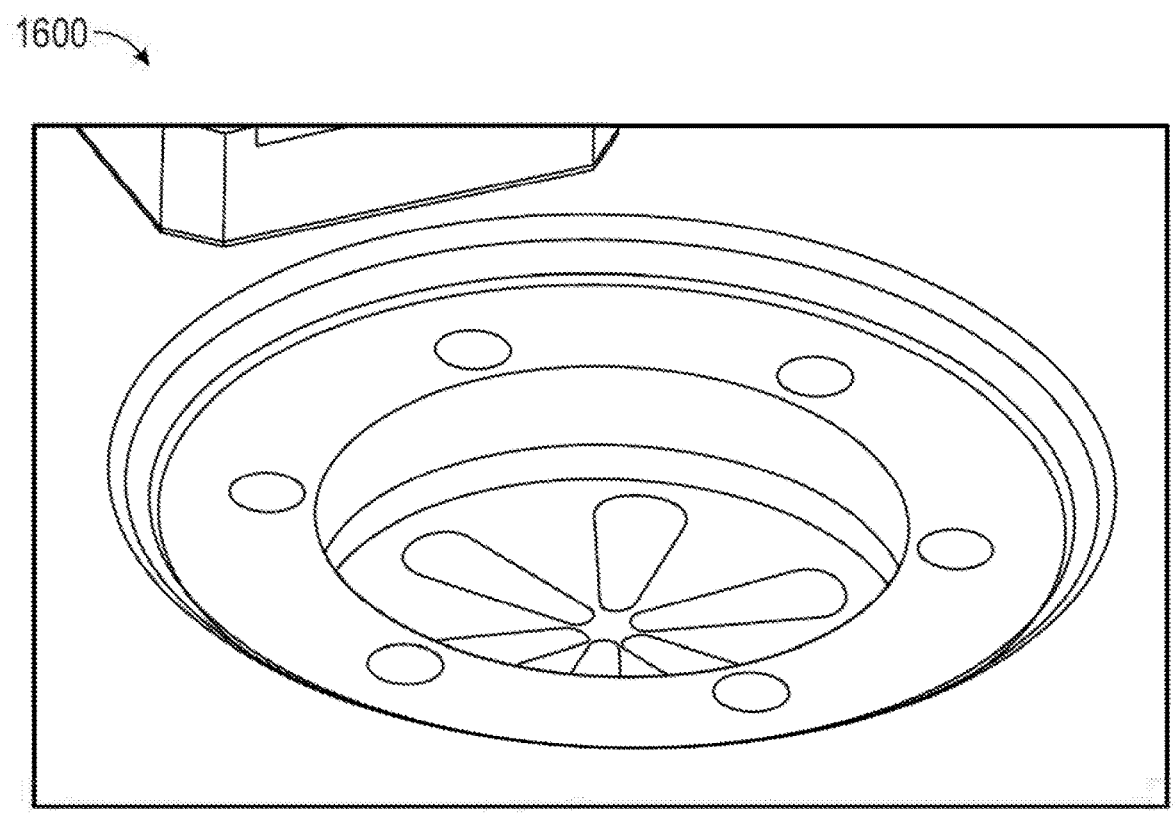
FIG. 16 illustrates an assembled view of the large gear assembly, in accordance with at least one embodiment.

FIG. 14 illustrates an exemplary view 1400 of the gear drive, in accordance with at least one embodiment. FIG. 15 illustrates lower view 1500 of the gear drive, in accordance with at least one embodiment. The FIG. 15 further shows the spring steel valve 1502 that isolates the cross-flow contamination of the plurality of materials to allow a positive extrusion of the materials. The spring steel valve 1502 further restricts the backflow of the materials. FIG. 16 illustrates an assembled view 1600 of the large gear assembly, in accordance with at least one embodiment.

Figure 17:
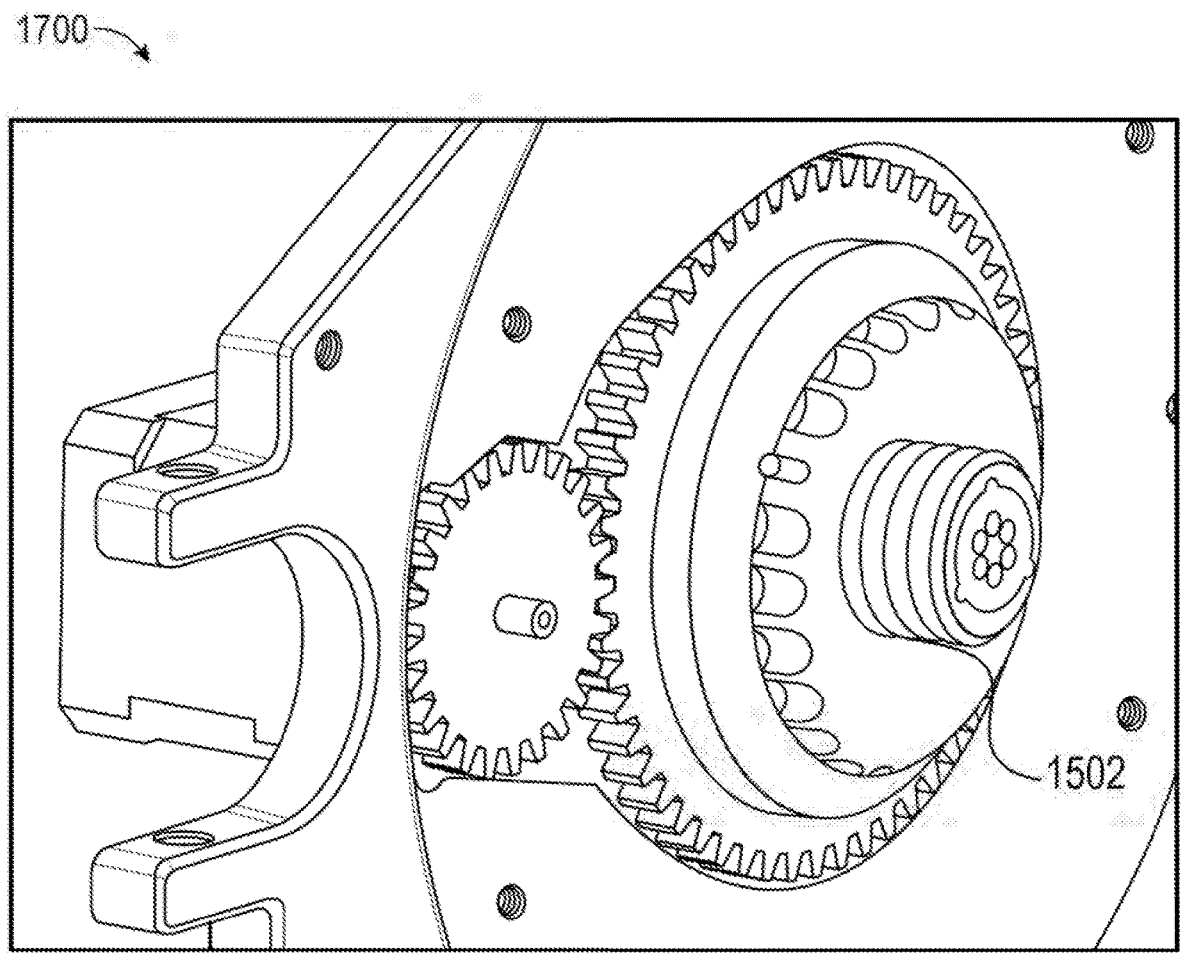
FIG. 17 illustrates an exemplary view of the lower carriage gear train, in accordance with at least one embodiment.
Figure 18:
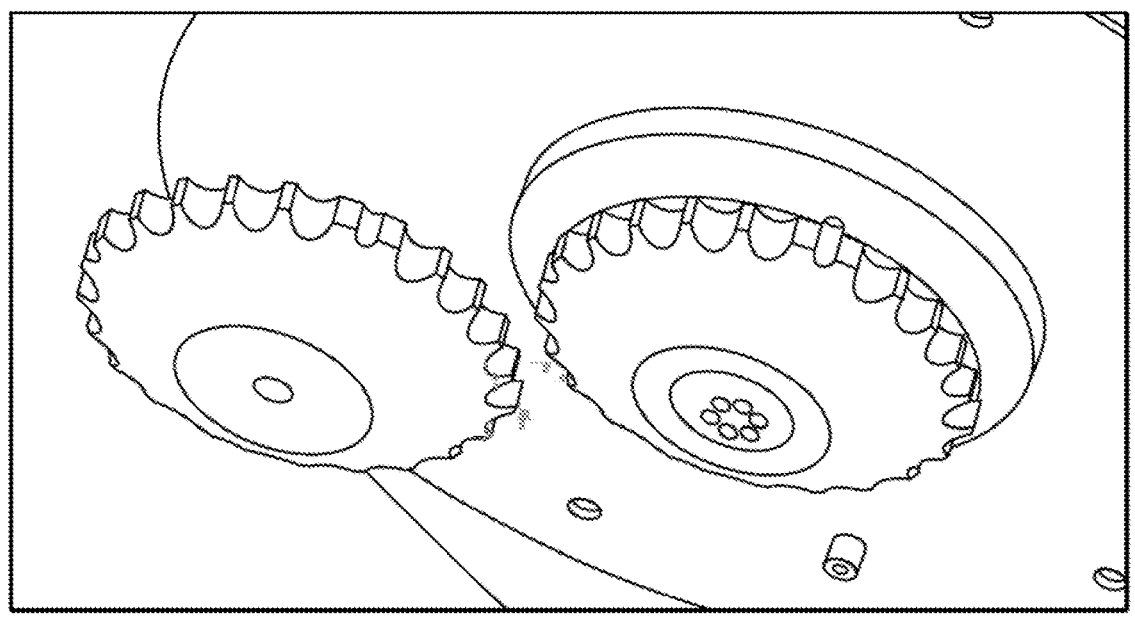
FIG. 18 illustrates an exemplary view of the lower carriage multi heads, in accordance with at least one embodiment.
Figure 19:
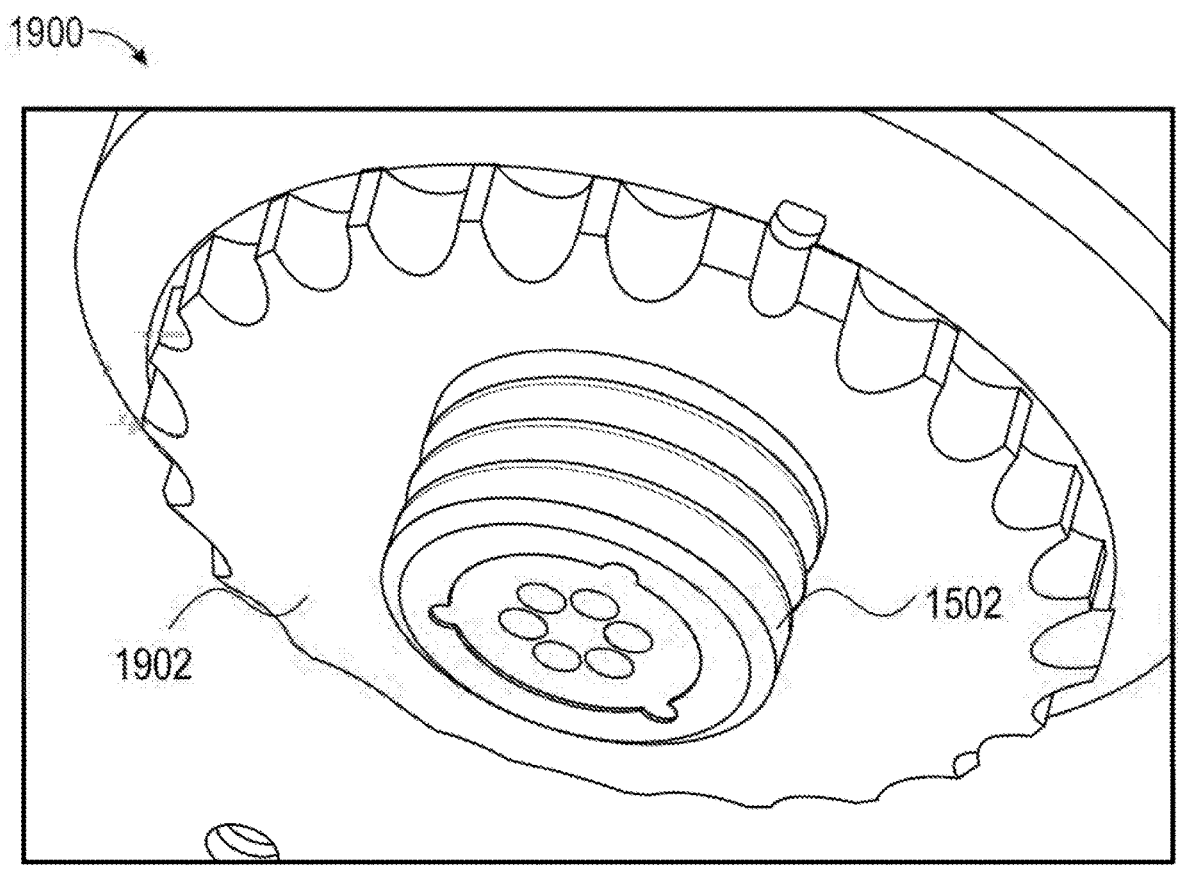
FIG. 19 illustrates an exemplary view of the lower carriage nozzle tip plate, in accordance with at least one embodiment.
Figure 20:
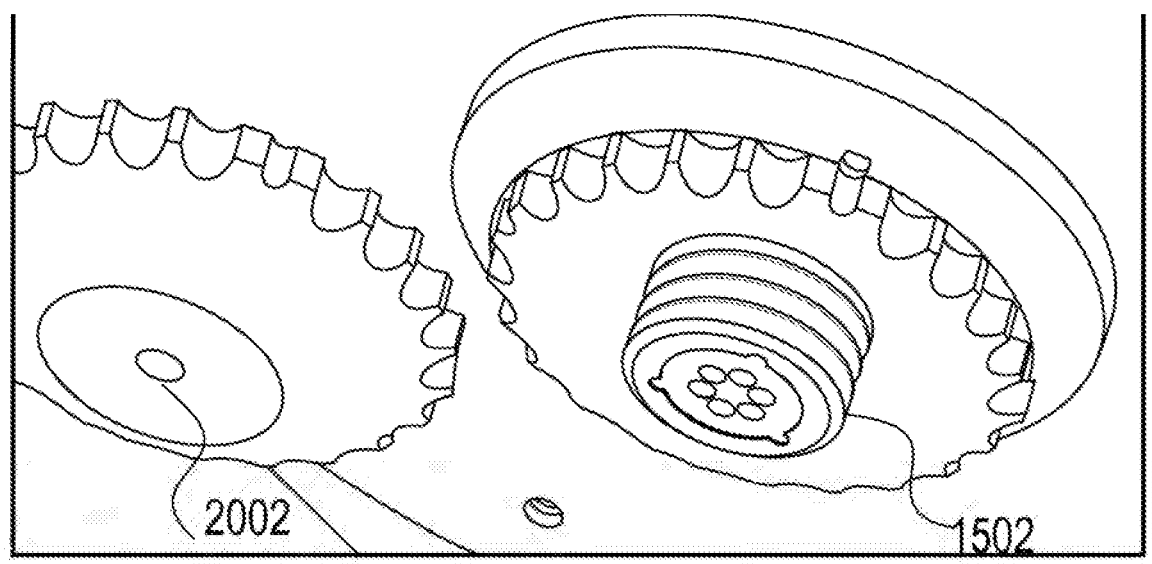
FIG. 20 illustrates an exemplary view of the lower carriage nozzle tip, in accordance with at least one embodiment.

FIG. 17 illustrates an exemplary view 1700 of the lower carriage gear train, in accordance with at least one embodiment. FIG. 18 illustrates an exemplary view 1800 of the lower carriage multi heads, in accordance with at least one embodiment. FIG. 19 illustrates an exemplary view 1900 of the lower carriage nozzle tip plate 1902, in accordance with at least one embodiment. FIG. 20 illustrates an exemplary view 2000 of the lower carriage nozzle tip 2002, in accordance with at least one embodiment.

Figure 21:
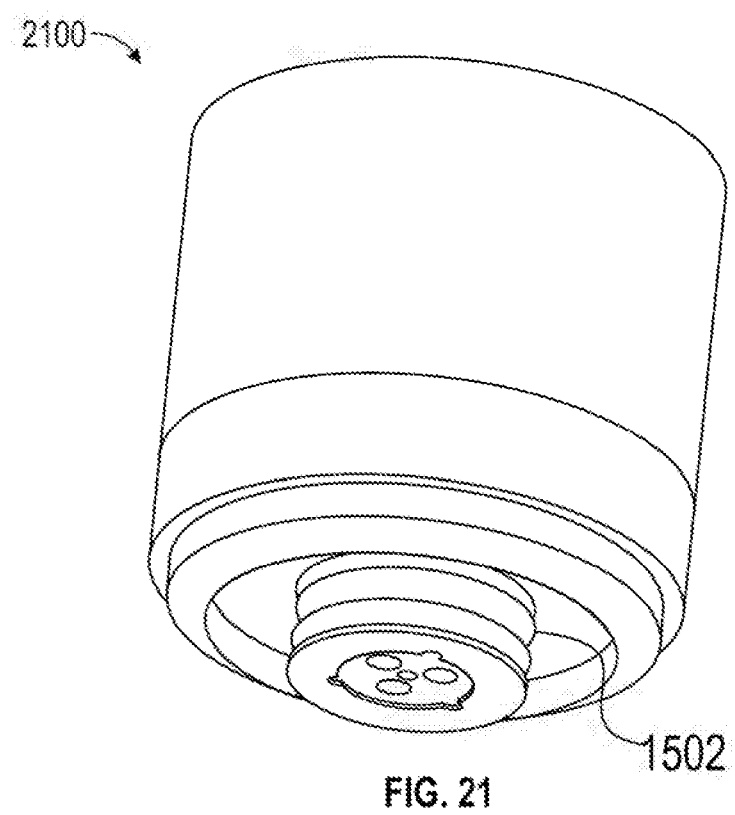
FIG. 21 illustrates a first view of the nozzle flow, in accordance with at least one embodiment.
Figure 22:
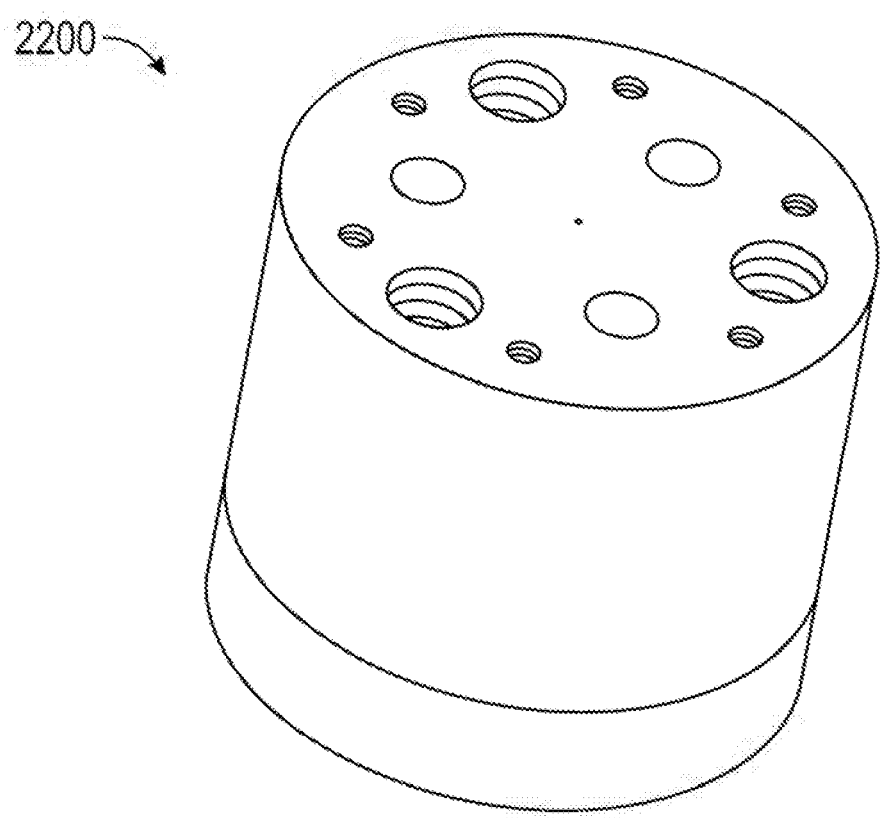
FIG. 22 illustrates a second view of the nozzle flow, in accordance with at least one embodiment.
Figure 23:
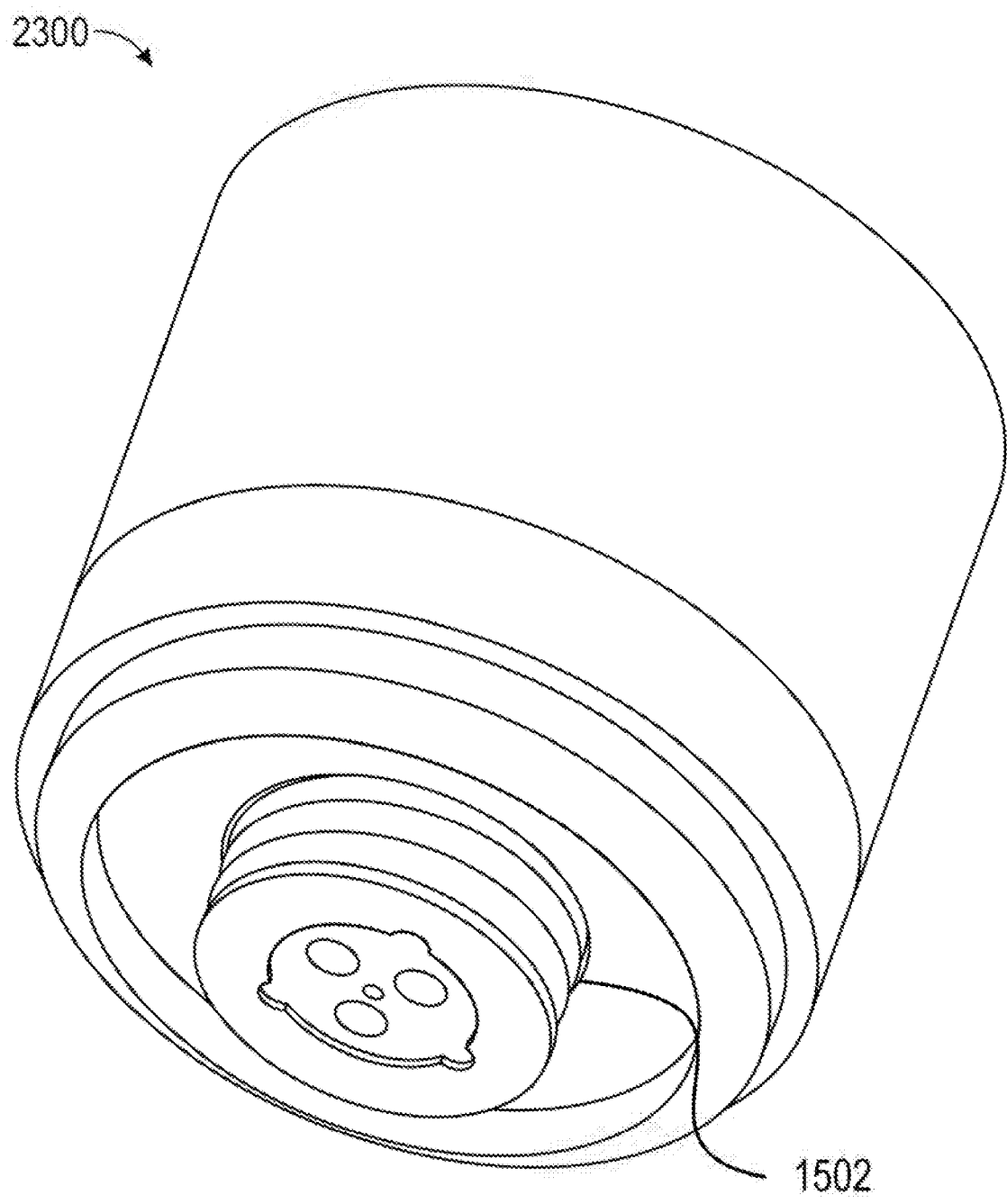
FIG. 23 illustrates a third view of the nozzle flow, in accordance with at least one embodiment.
Figure 24:
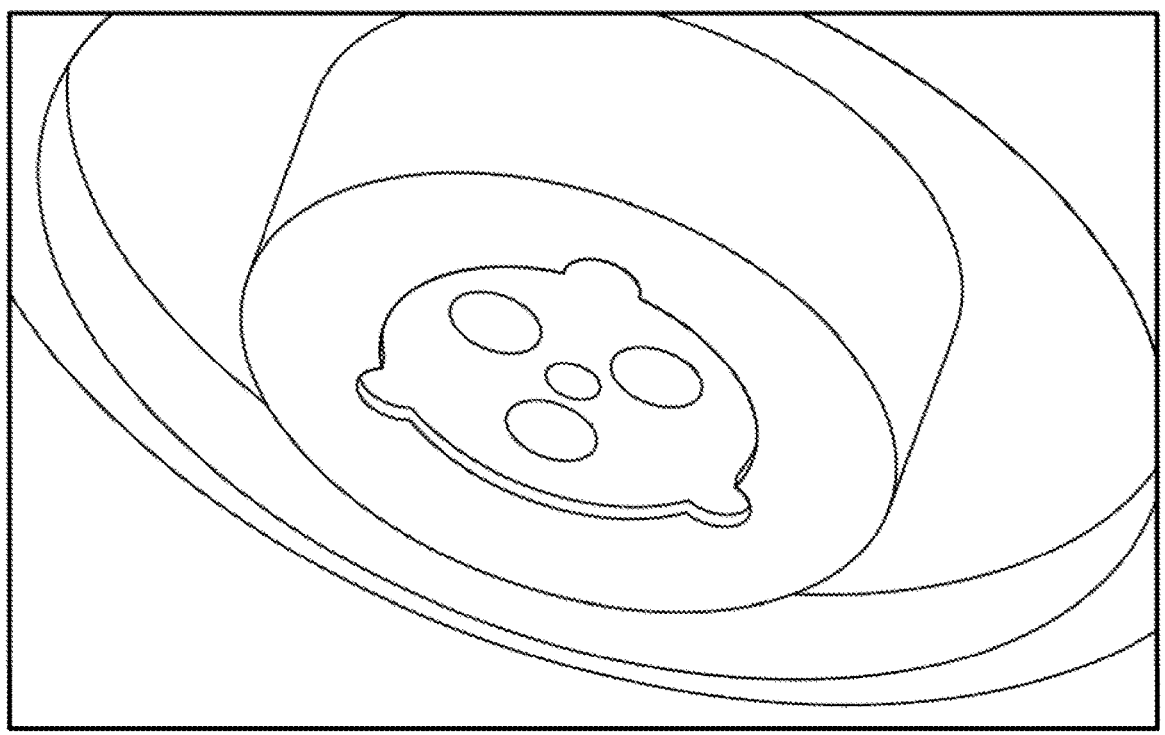
FIG. 24 illustrates a fourth view of the nozzle flow, in accordance with at least one embodiment.
Figure 25:
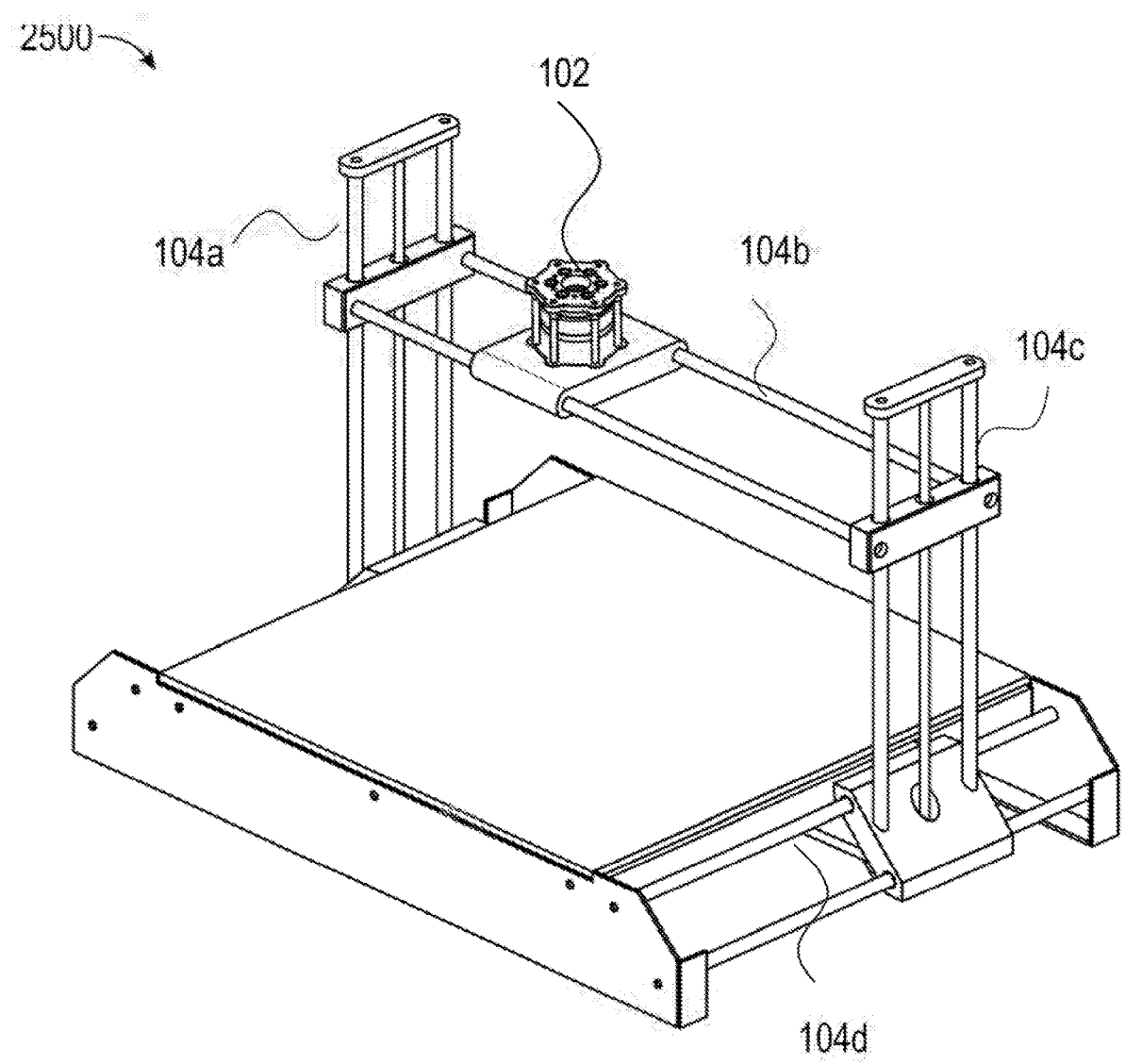
FIG. 25 illustrates a gantry assembly of the robotic apparatus, in accordance with at least one embodiment.

FIG. 21 illustrates a first view 2100 of the nozzle flow, in accordance with at least one embodiment. FIG. 22 illustrates a second view 2200 of the nozzle flow, in accordance with at least one embodiment. FIG. 23 illustrates a third view 2300 of the nozzle flow, in accordance with at least one embodiment. FIG. 24 illustrates a fourth view 2400 of the nozzle flow, in accordance with at least one embodiment. FIG. 25 illustrates a gantry assembly 2500 of the robotic apparatus 100, in accordance with at least one embodiment.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms enclosed. On the contrary, the intention is to cover all modifications, alternative constructions, and equivalents falling within the spirit and scope of the invention, as defined in the appended claims. Thus, it is intended that the present invention cover the modifications and variations of this invention, provided they are within the scope of the appended claims and their equivalents.

What is claimed is:

1. An apparatus for building a multidimensional object, the apparatus comprising:
   an extruder unit, comprising:
     a plurality of nozzles and a plurality of changeable orifices, wherein an orifice of the plurality of changeable orifices is configured to extrude a predefined pattern of a material of a plurality of materials; and
     an isolation valve configured to isolate cross flow contamination of the plurality of materials while extruding the plurality of materials, wherein
     the extruder unit is configured to move in a forward direction and a reverse direction while extruding the plurality of materials, and
     the plurality of materials extruded through the plurality of changeable orifices do not cross each other in the movement of the extruder unit;
   a support structure comprising a plurality of surfaces forming a frame cabinet and a plurality of rails mechanically supported by the frame cabinet, wherein the plurality of rails is configured to form a multidimensional path for the extruder unit, and the frame cabinet is configured to enclose the apparatus and limiting ambient air inclusion;
   a platform supporting the multidimensional object, wherein the platform comprises a vacuum orifice to draw emitted gases; and
   a lower carriage nozzle tip plate, wherein the isolation valve is between the lower carriage nozzle tip plate and the extruder unit, and the isolation valve is a single spring valve configured to allow a positive extrusion of the plurality of materials.

2. The apparatus of claim 1, wherein the extruder unit comprises:
   a temperature sensing mechanism configured to measure a temperature of the received plurality of materials; and
   a cooling mechanism comprising a recirculating liquid placed in vicinity of the extruder unit to adjust a temperature of the multidimensional object.

3. The apparatus of claim 1, wherein the orifice comprises a die having a predefined output geometry.

4. The apparatus of claim 1, further comprising a motor unit configured to control a movement of the extruder unit.

5. The apparatus of claim 1, wherein the platform comprises an internal pump configured to extrude the plurality of materials.

6. The apparatus of claim 1, wherein the platform is configured to rotate 120 degrees.

7. The apparatus of claim 2, further comprising:
   a cooling fluid circulated in vicinity of the plurality of nozzles to control a temperature of each of the plurality of nozzles.

8. The apparatus of claim 1, wherein the extruder unit further comprises a first section having a first temperature and configured to receive the plurality of materials, a second section having a second temperature and configured to extrude the plurality of materials, and a heat barrier to separate the first section and the second section, and wherein the second temperature is higher than the first temperature.

9. The apparatus of claim 4, wherein the motor unit comprises a pump and drive mechanism configured to change an orifice of the plurality of changeable orifices.

10. The apparatus of claim 1, wherein the extruder unit has a 360-degree freedom of movement.

11. The apparatus of claim 1, further comprising an optical source configured to modify a physical state of the extruded multidimensional object.

12. The apparatus of claim 11, wherein the optical source comprises an optical laser.

13. The apparatus of claim 1, further configured to form hollow cavities in the multidimensional object using a technique comprising void layering distribution.

14. The apparatus of claim 1, wherein the spring valve is further configured to restrict backflow of the plurality of materials from the plurality of nozzles.

15. The apparatus of claim 4, wherein the motor unit comprises an array of motors and drives configured to control the movement of the extruder unit in at least one of a latitudinal or a longitudinal direction.

16. The apparatus of claim 1, further comprising:
 a robotic arm configured to move the multidimensional object out of the apparatus.

17. The apparatus of claim 1, wherein the frame cabinet further comprises a door for access, a lock, and an electrical switch configured to trigger an alarm when the electrical switch is opened and to terminate a motion in the frame cabinet.

\* \* \* \* \*